Sept. 25, 1951     G. G. MITCHELL     2,569,016
EMBALMING APPARATUS
Filed Jan. 7, 1946     2 Sheets-Sheet 1
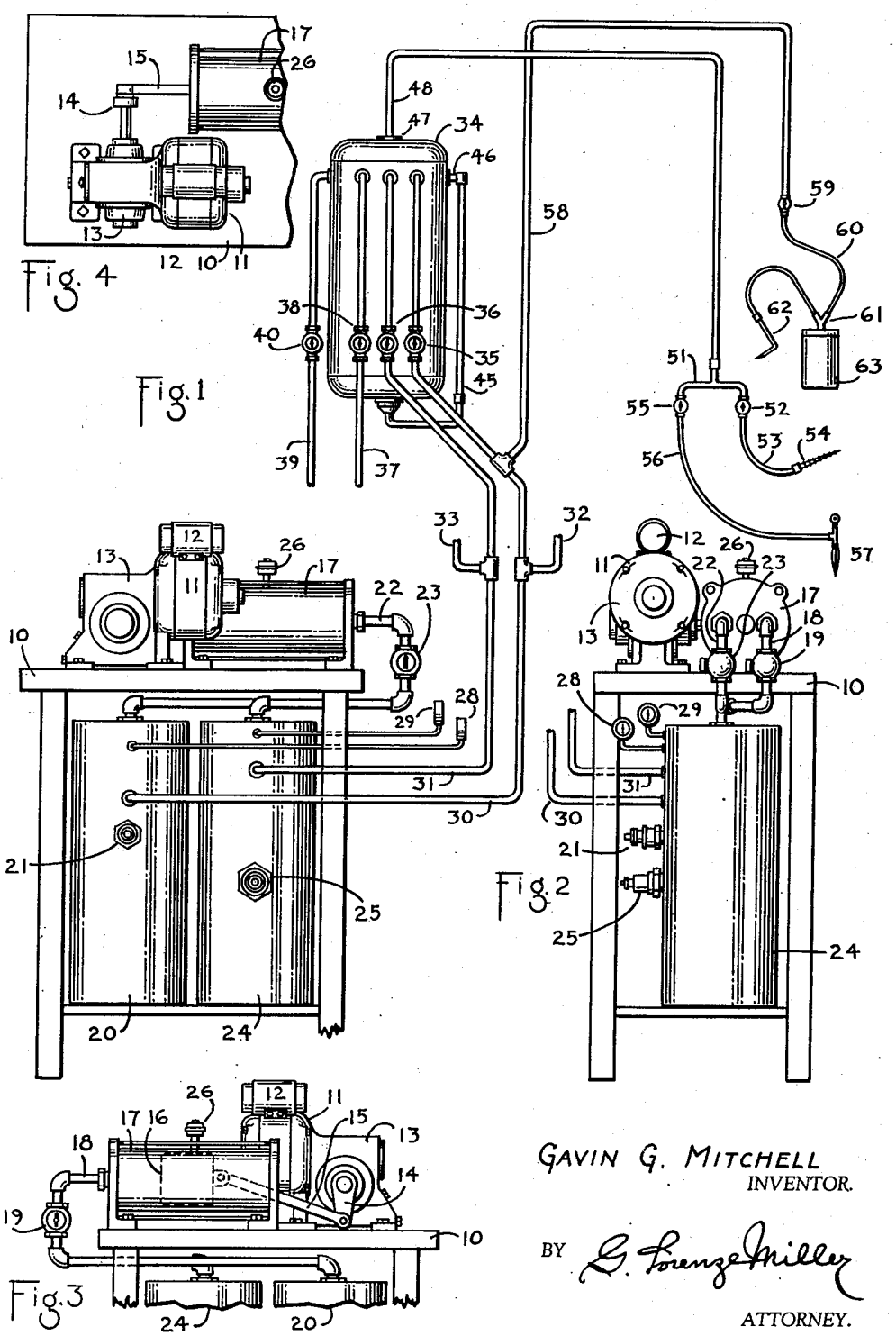
GAVIN G. MITCHELL
INVENTOR.
BY G. Lorenze Miller
ATTORNEY.

Sept. 25, 1951 G. G. MITCHELL 2,569,016
EMBALMING APPARATUS
Filed Jan. 7, 1946 2 Sheets-Sheet 2
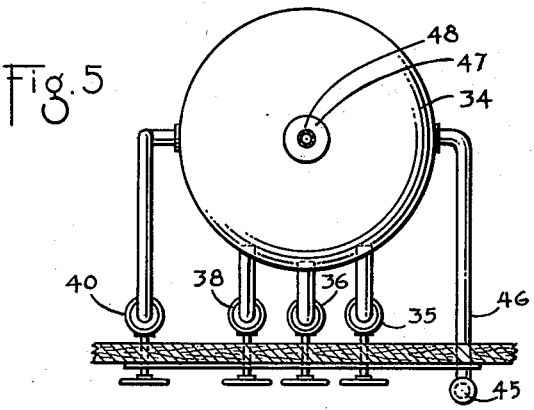
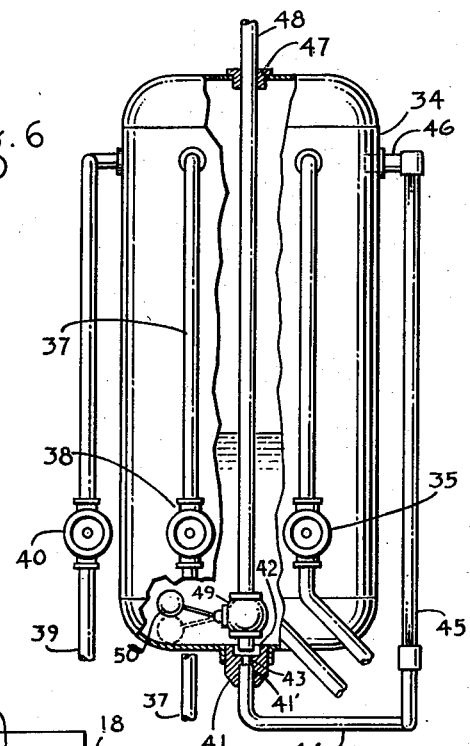
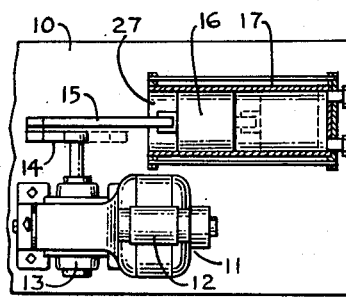
GAVIN G. MITCHELL
INVENTOR.
BY G. Lorenz Miller
ATTORNEY.

Patented Sept. 25, 1951

2,569,016

UNITED STATES PATENT OFFICE 2,569,016

EMBALMING APPARATUS

Gavin G. Mitchell, Decatur, Ill.

Application January 7, 1946, Serial No. 639,552

6 Claims. (Cl. 27—24)

My invention relates to apparatus and systems for embalming dead human bodies, and more particularly to apparatus and processes employed in aspirating the arteries and veins and injecting therein the embalming fluid.

The primary object of my invention is to provide means of embalming which will enable several embalmers to work simultaneously with greater convenience and efficiency than has been possible with apparatus heretofore available.

More specifically, my invention contemplates the provision of a single power operated vacuum and compression unit with automatic vacuum and pressure controls, a plurality of fluid mixing tanks associated therewith, and a distribution system to communicate an automatically regulated vacuum and pressure to selected mixing tanks and thence to aspirating and injection instrumentalities at a plurality of embalming tables so that several individual embalming operations may be conducted simultaneously.

A further important object of my invention is the provision of a compact vacuum and compression unit with mixing tanks and a distribution system which may be incorporated in new or old preparation rooms, and which may be built within the walls of newly erected funeral establishments, the vacuum and compression unit being of such assembled form as to fit within a paneled cabinet with the necessary control elements located on the outside of the panel, the pipes of the distribution system being easily concealed in the floor, wall or ceiling.

Further objects and advantages of my improved apparatus and process will appear from the following description and the accompanying drawings forming a part of this application.

In the drawings:

Fig. 1 is a schematic front elevation of my improved apparatus;

Fig. 2 is an end elevation of the vacuum and compression unit;

Fig. 3 is a side elevation of the vacuum and compression unit taken from the opposite side of that of Fig. 1;

Fig. 4 is a partial top plan of the apparatus shown in Fig. 1;

Fig. 5 is a top plan view of the fluid mixing tank;

Fig. 6 is an enlarged partly broken away front elevation of the mixing tank, and Fig. 7 is a top plan view similar to Fig. 4, but showing the vacuum and compression cylinder in cross section.

Referring to the drawings by numerals in which like numerals designate like parts in the several views, 10 is a table upon which is mounted the vacuum and pressure generating mechanisms comprising an electric motor 11, capacitor 12, reduction gear 13, crank 14, connecting rod 15, and piston 16 mounted for reciprocal movement in cylinder 17. A pipe 18 communicates through a check valve 19 with a vacuum tank 20. An adjustable vacuum relief valve 21 communicates with the interior of the vacuum tank. A pipe 22 communicates through check valve 23 with a compression tank 24. An adjustable pressure relief valve 25 communicates with the interior of the compression tank. Thus it will be seen that the same end of cylinder 17 is in communication with both the vacuum tank 20 and the compression tank 24. It will now be explained how a predetermined vacuum and a predetermined pressure in tanks may be generated.

As shown in Fig. 3, an air intake valve 26 of any suitable design is in communication with the interior of cylinder 17 at a point intermediate the ends of the cylinder. As shown more clearly in Fig. 7, the end 27 of the cylinder 17 is open to permit the expulsion of the air from that end. As shown, the piston is at its extreme outward position, and the inner end of the piston has cleared the air intake port of valve 26 which broke the vacuum resulting from the outward stroke of piston 16. However, the vacuum created in tank 20 is held therein by check valve 19. Now, upon the return stroke of the piston, air having been admitted to the inner end of cylinder 17, will be compressed into tank 24 and the pressure therein will be held by check valve 23. A vacuum gage 28 and a pressure gage 29 are installed in communication with the interiors of tanks 20 and 24, respectively, so that the vacuum and pressure relief valves may be accurately adjusted to the predetermined vacuum and pressure, respectively.

Direct pipes 30 and 31 and branch pipes 32 and 33 extend, respectively, from vacuum tank 20 and compression tank 24 to a plurality of fluid mixing tanks 34, which are preferably located near the individual embalming tables. Each mixing tank has a shut-off valve 35 on the vacuum line and a similar shut-off valve 36 on the pressure line. Communicating with tank 34 is a supply pipe 37 leading from a convenient source of water supply, having a shut-off valve 38 therein adjacent the tank. Another pipe 39 having an open intake end is also connected to tank 34, and this pipe has a shut-off valve 40.

As more clearly illustrated in Fig. 6, each fluid mixing tank 34 has in its bottom end a fitting 41, this fitting having a socket 41' in its outer end, an enlarged recess 42 in its inner end and a reduced orifice 43 connecting said socket and recess. A pipe 44 extends from socket 41' to a transparent fluid level gage 45, the upper end of which is connected by pipe 46 into tank 34. Projecting through a fitting 47 in the upper end of tank 34 is a pipe 48, the lower end of which extends slightly into recess 42. A float valve 49, controlled by a float 50 is connected in pipe 48 near its lower end.

Pipe 48 has at its outer end a branch connection 51 with a stop cock 52 controlling a hose 53 connected to one pipe of injection instrument 54, and another stop cock 55 controlling a hose 56 connected to another type of injection instrument 57.

A branch pipe 58 connected to a vacuum line 30 has at its outer end a stop cock 59 controlling a hose 60 connected to an aspirator 61, which in turn is connected to an aspirating instrument 62, having an outlet into container 63.

In beginning operation of the vacuum and pressure generating unit, valves 35, 36, 38 and 40 are all closed. Motor 11 is started, which creates a partial vacuum in tank 20 and pressure in tank 24. Relief valves 21 and 25 are then adjusted to the predetermined vacuum and pressure as required for the embalming process, the vacuum and pressure in the respective tanks being shown by gages 28 and 29.

After the vacuum and pressure have reached the points desired, vacuum valve 35 is opened to create a vacuum in mixing tank 34. Next, a bottle of concentrated embalming fluid (not shown) is placed over the open end of pipe 39, and valve 40 opened. The vacuum in tank 34 will immediately draw the fluid from the bottle into the tank, after which valve 40 is closed. Water valve 38 is then opened, thus permitting a sufficient quantity of water to properly dilute the concentrated fluid to be drawn into the tank, after which valve 38 is closed. Vacuum valve 35 will also be closed in preparation for creating pressure in tank 34 to be used in the injection operation. As will be hereinafter explained, the vacuum used in the aspirating operation is obtained direct from vacuum tank 20.

After proper insertion of aspirating instrument 62 stop cock 59 is opened, thus placing the instrument in direct communication with vacuum tank 20 to withdraw the blood from the body into container 63.

To begin the injection operation the embalmer first opens the valve 36 to admit pressure from tank 24 into mixing tank 34, and then opens stop cocks 52 and 55 to permit air trapped in pipe 48 to escape to the atmosphere. As soon as fluid appears at the outlets of injection instruments 54 and 57 the stop cocks are closed until the said instruments have been properly inserted in the body. Injection then begins immediately upon opening said stop cocks. It should be understood, however, that when only one injection instrument is inserted, the stop cock associated with that instrument is the only one opened.

One important feature of my invention is that both the aspirating operation and the injection operation may be conducted in one body at the same time. This is rendered possible by the direct connection of the vacuum tank 20 with the aspirating instrument 62 which enables the embalmer to continue this operation while proceding with the injection operation.

As hereinbefore explained, several operating tables may be in use at the same time, all being supplied with vacuum and pressure from the single unit, and without any interference with one another. Moreover, the pipes which transmit the vacuum and pressure to the several operating tables may be so concealed in walls, floors or ceiling, that only the connections are exposed at the various tables. Thus, with the vacuum and pressure unit concealed in a niche or cabinet in the wall, the floor of the preparation room is left entirely unobstructed with equipment other than the essential operating tables, and it will appear readily evident that the motor, cylinder, capacitor etc., may be concealed in a suitable cabinet apart from the operating room and adapted for convenient accessibility. This effects great economy in space, and also enables the several operators to work with great convenience and efficiency.

When the fluid in one of the mixing tanks 34 is exhausted the float 50 will be lowered, thus closing valve 49 and shutting off the pressure communication to injection instruments 54 and 57. This prevents compressed air from entering the body being embalmed.

Automatic regulation of the vacuum in tank 20 and the pressure in tank 24, insures gentle action of the aspirating and injection operations, and precludes the possibility of collapse or bloating of the body being embalmed.

As heretofore explained the illustrations in the drawings are schematic only, and it is to be understood that changes or modifications in the various elements comprising my improved apparatus may be made within the scope of the following claims without departing from the spirit of my invention.

Having described my invention and the novel features which I desire to cover by Letters Patent, I claim:

1. In an embalming apparatus of the character described, in combination, a mixing tank for water and embalming liquid, a source of water supply connected to said tank, a source of embalming liquid connected to said tank, a vacuum tank communicating with said mixing tank and providing an air exhaust for drawing water and embalming liquid into said mixing tank, a compressed air storage tank providing a source of air under pressure connected to the mixing tank for ejecting a mixture of water and embalming liquid therefrom, manually controlled aspirating means connected intermediate the vacuum and mixing tanks and operable by said air exhaust for withdrawing and receiving fluid from a body to be embalmed, manually controlled injector means connected to the mixing tank for conveying a liquid mixture therefrom under pressure and injecting the liquid mixture into a body from which fluid has been withdrawn by said aspirating means, and means for intermittently and alternately creating a partial vacuum in the vacuum tank and compressing air in the air storage tank respectively.

2. In an embalming apparatus of the character described, in combination, in accordance with claim 1, in which each of the connections leading to the mixing tank is provided with manually operated means for controlling the passage of fluid therethrough.

3. In an embalming apparatus of the class described, in combination, a mixing tank for water and embalming liquid, a source of water supply connected to said tank, a source of embalming liquid connected to said tank, a vacuum tank communicating with said mixing tank and providing an air exhaust for drawing water and embalming liquid into said mixing tank, a compressed air storage tank providing a source of air under pressure connected to the mixing tank for ejecting a mixture of water and embalming liquid therefrom, manually controlled injector means connected to the mixing tank for conveying a liquid mixture therefrom under pressure and injecting the liquid mixture into a body, and means for intermittently and alternately creating a partial vacuum in the vacuum tank and compressing air in the air storage tank respectively.

4. In an embalming apparatus of the character described, in combination, in accordance with claim 3, in which each of the connections leading to the mixing tank is provided with manually operated means for controlling the passage of fluid therethrough.

5. In an embalming apparatus of the class described, in combination, a mixing tank for water and embalming liquid, a source of water supply connected to said mixing tank, a source of embalming liquid connected to said mixing tank, a vacuum tank communicating with said mixing tank and providing an air exhaust for drawing water and embalming liquid into said mixing tank, a compressed air storage tank providing a source of air under pressure connected to the mixing tank for ejecting a mixture of water and liquid therefrom and a pump for creating a vacuum in the vacuum tank and compressing air in the air storage tank respectively.

6. In an embalming apparatus of the class decribed, in combination, a mixing tank for water and embalming liquid, a source of water supply connected to said mixing tank, a source of embalming liquid connected to said mixing tank, a vacuum tank communicating with said mixing tank through piping and providing an air exhaust for drawing water and embalming liquid into said mixing tank, a compressed air storage tank providing a source of air under pressure connected to the mixing tank through piping for ejecting a mixture of water and liquid therefrom and a pump for creating a vacuum in the vacuum tank and compressing air in the air storage tank respectively, said piping connection between the vacuum tank and the mixing tank having a fitting for obtaining vacuum from said pipe.

GAVIN G. MITCHELL.

REFERENCES CITED

The following references are of record in the file of this patent:

UNITED STATES PATENTS

| Number | Name | Date |
| --- | --- | --- |
| 737,336 | Cain | Aug. 25, 1903 |
| 995,248 | Gildea | June 13, 1911 |
| 1,323,864 | Human | Dec. 2, 1919 |
| 1,349,766 | Hunt | Aug. 17, 1920 |
| 1,829,144 | Kaiser | Oct. 27, 1931 |
| 2,118,704 | Grontkowski | May 24, 1938 |
| 2,203,832 | Malburg | June 11, 1940 |
| 2,232,862 | Moody | Feb. 25, 1941 |
| 2,232,863 | Moody | Feb. 25, 1941 |
| 2,252,624 | Gilmore et al. | Aug. 12, 1941 |
| 2,388,337 | Moody | Nov. 6, 1945 |